Feb. 9, 1926.
J. ALSFASSER
1,571,990
LOCK FOR DAMPER REGULATORS
Filed Sept. 12, 1923
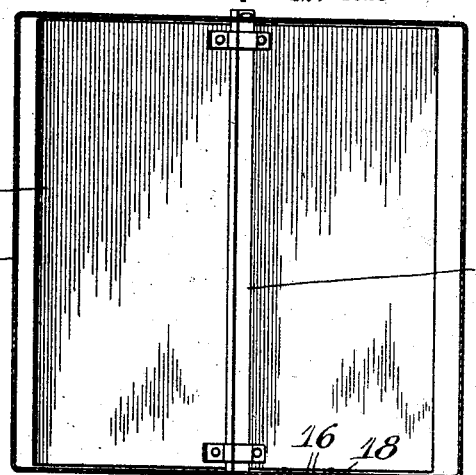
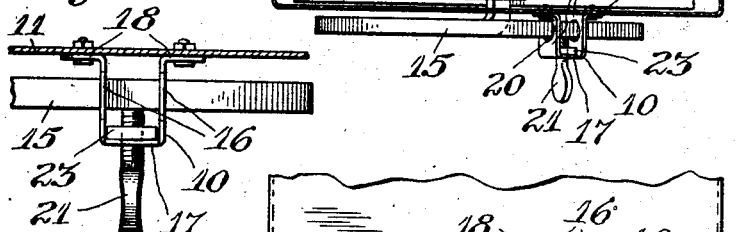
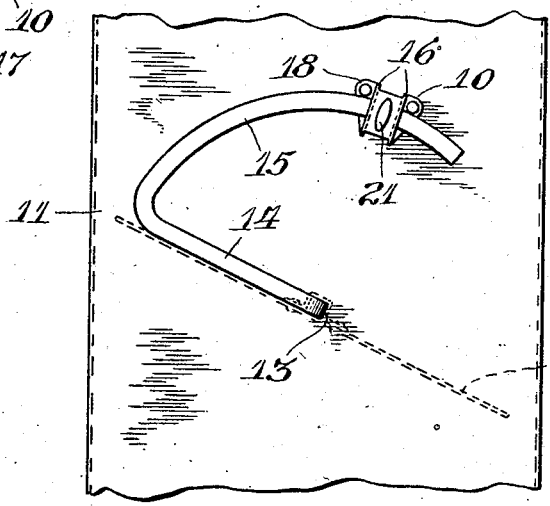
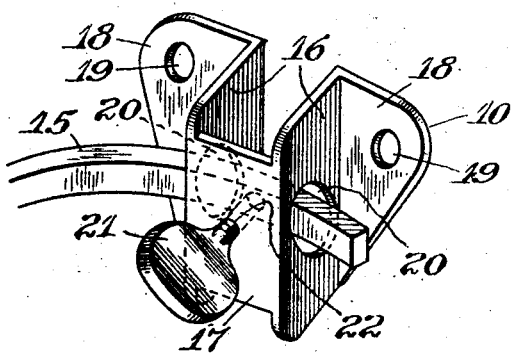
Inventor:
Joseph Alsfasser,
By Sprinkle & Smith
Atty.

Patented Feb. 9, 1926.

1,571,990

UNITED STATES PATENT OFFICE.

JOSEPH ALSFASSER, OF CHICAGO, ILLINOIS.

LOCK FOR DAMPER REGULATORS.

Application filed September 12, 1923. Serial No. 662,192.

*To all whom it may concern:*

Be it known that I, JOSEPH ALSFASSER, a citizen of the United States, residing at Chicago, in the county of Cook and State of Illinois, have invented certain new and useful Improvements in Locks for Damper Regulators, of which the following is a specification.

My invention relates to damper controls for ventilating and heating ducts and the like, and particularly to brackets capable of association with the damper regulators for such ducts, which bracket cooperates with damper operating lever to hold the damper in any of its various positions.

The invention has among its various objects the provision of a structure which may be readily formed of a blank of relatively thin material and thus provide means whereby it may be secured in position relatively to the duct, receive the lever of the damper and in addition be provided with means whereby said lever of the damper may be engaged and relatively held in any of its various adjusted positions yet will produce a strong structure which cannot readily be bent out of shape or be otherwise injured and rendered useless.

It is a further object to construct the bracket so that it may be co-operatively associated with said lever of the damper and compensate for various distances between said part and the duct in which the damper is arranged.

The invention will be explained in detail and more readily understood when read in conjunction with the accompanying drawings which illustrate one form of which the invention is susceptible, it being obvious that changes and modifications may be resorted to without departing from the spirit of the appended claim forming a part hereof.

In the drawings, Fig. 1 is a side elevational view of a duct having the invention applied thereto.

Fig. 2 is a top plan view of the structure shown in Fig. 1.

Fig. 3 is an enlarged perspective view of the bracket shown in Figs. 1 and 2, and Fig. 4 is a top plan view of the bracket showing the manner in which the nut is secured against rotation.

The structure illustrated in the drawings for accomplishing the desired result is generally designated as 10, and is illustrated as associated with a duct 11 having the damper 12 arranged for adjustment therein. This damper 12 is secured to a member 13 which is passed through and journalled in the oppositely disposed side walls of the duct and is formed to provide the lever 14 having the arcuate segmental extension 15. The bracket generally designated as 10 is constructed so as to permit it to be arranged relatively to said extension and is provided with means for engaging this portion to thereby adjustably hold it and the damper in any of its various positions. In many instances the segmental extension which provides the means with which the bracket co-operates to hold the damper in its various positions is arranged at relatively different distances from the side wall of the duct, the bracket illustrated in the drawings being constructed to compensate for these variations.

The bracket 10 is formed of a suitably shaped blank of metallic sheet material formed and bent to produce the parallel separated side walls 16—16, which are connected together by the end wall 17. The side walls 16—16 terminate in the laterally projecting walls 18—18 which extend at right angles to the walls 16—16 and each of said projecting portions are provided with an aperture 19 through which a rivet or bolt may be passed to thereby secure the bracket with relation to the duct. It is evident from the foregoing explanation of the structure of the bracket that a strong and durable structure is provided which cannot readily be bent out of shape or be otherwise rendered useless after being applied to the duct. The parallel separated side walls 16—16 are each provided with an aperture such as 20, one of which is in alignment with the other, and are provided to receive the extension 15 of the damper lever 14. These apertures 20—20 are of a sufficient dimension to allow the bracket to be associated with the extension 15 or other similar member even though the distance between said extension and the side wall of the duct vary, yet will co-operate to hold the extension relatively to the bracket when caused to do so by the thumb clamping screw 21, which is designed to engage the extension and cause it to be held. This clamping screw is passed through an aperture 22 provided in the connecting wall 17, the screw being loosely arranged in the aperture and being in threaded engagement with the internally threaded member or nut 23 which is arranged between the parallel separated side walls 16—16 and held against rotation thereby. The thumb screw 21 and the nut 23 provide the means for releasably holding the extension and the damper in its various adjusted positions, as it is evident that the manipulations of the thumb screw will engage or release the extension and thereby permit the extension and its associated parts to be adjusted and held in its various adjusted positions.

Having thus described the invention, what I claim and desire to cover by Letters Patent is:

A bracket having a body portion consisting of parallel separated connected walls, the ends of both walls terminating in apertured lateral walls adapted to receive means whereby it may be secured in position, said parallel walls being provided with aligned apertures in which a lever secured to a damper may operate, there being an aperture in said body portion, the axis thereof being transverse to said first mentioned apertures, a nut confined between and contacting with the parallel walls of said body portion, and a screw arranged in said last mentioned aperture and being in threaded engagement with the nut confined between said walls, said screw which is arranged in said aperture providing means for co-operating with the member secured to the damper to hold said member in adjusted position.

In testimony whereof I have signed my name to this specification on this 7th day of September, A. D. 1923.

JOSEPH ALSFASSER.